Patented June 3, 1930

1,762,052

UNITED STATES PATENT OFFICE

CHARLES DODDS, OF TIPTON, IOWA

ADJUSTABLE STEP FOR VEHICLES

Application filed July 24, 1929. Serial No. 380,609.

This invention relates to certain new and useful improvements in step treads especially designed for application upon vehicles of the common carrier class.

An object of the invention contemplates the provision and arrangement of means whereby the step may be retracted while the vehicle is in motion.

Another object of the invention consists of retaining means for the step to yieldingly hold the latter in normally inactive positions.

An additional object of the invention embodies an operating mechanism whereby the steps may be controlled from a remote point.

With the above and other objects in view, the invention further consists of the following novel features and details of construction, to be hereinafter more fully described, illustrated in the accompanying drawing and pointed out in the appended claim.

In the drawing :—

Figure 1 is a side elevation of my invention illustrating by full and dotted lines the respective positions of the mechanism when extended and retracted.

Figure 2 is a top plan view of the device extended for use.

Referring to the drawing in detail wherein like characters of reference denote corresponding parts, the reference character 10 indicates generally the chassis of a vehicle, not shown, having bolsters 11 arranged horizontally thereof upon its upper side and at spaced intervals to support the side rails 12 of a vehicle body construction. Spacers 13, arranged in the manner shown, are designed to carry the bottom or floor of the vehicle body.

The invention primarily resides in the provision and arrangement of leg members 14 of plate like construction having pivotal connection at their uppermost ends with the inner sides of the rails 12 of the vehicle body and adjacent the rearmost extending ends thereof. Bolt members 15 are employed as the means of attachment for the legs and which also permit pivotal swinging movement therefrom. Shelf portions 16, right-angularly offset from the lowermost depending ends of the legs, are twisted immediately adjacent the intersection whereby the shelf portions will expose a relatively wide flat surface to those portions of a step tread 17 supported thereby.

Locking plates 18 of elongated formation having eccentric pivotal connection with the legs 14 at their outermost ends are upwardly and obliquely inclined from the pivot connections for sliding adjustable connection with the adjacent ends of the bolsters 11. Said locking plates have notches or portions removed, indicated generally as at 18' to define shoulders 19 to facilitate flush contact with the adjacent side of the bolster aforementioned. The method of association or connection between the bolster and the shoulder portions 19 of the locking plates 18 incident to the provision of the notches 18' will rigidly retain the step in the position shown and against accidental displacement. A retractile spring 20 having connection at its ends with the intermediate portion of the tread 17 and at a similar point upon another of the bolsters 11 is adapted to cause frictional contacting engagement of said bolsters at all times with the first mentioned of the bolsters when the step is extended for use.

Yokes 21 of substantially U-shape formation are inverted in the manner shown in Figure 2 of the drawing and supported terminally thereof upon the upper side of the first mentioned of the bolsters to slidingly accommodate the notched ends of the locking plates whereby the latter will be guided while sliding to prevent binding action at its point of pivotal connection with the legs.

It is also my intention to provide a release mechanism for the tread or step and which resides in the employment of chain members 22 joined at their outermost ends with a common pull ring 23 and subsequently passed through a screw eye 24 conveniently arranged upon the under surface of the rearmost of the spacers 13. The opposite obliquely disposed ends of the chain members are passed over pulley wheels 25 upon the side of the spacer immediately adjacent the screw eye supporting spacer whereby said chains will be arranged immediately above the lock- Patented June 3, 1930

1,762,053

UNITED STATES PATENT OFFICE

ALFRED EHRENREICH, OF LONDON, ENGLAND

TREATMENT OF FISH SKINS

No Drawing. Application filed January 24, 1928, Serial No. 249,204, and in Belgium January 26, 1927.

This invention relates to an improved process for the preparatory treatment of skins of fish such as and in particular, the Plagiostomi.

The invention has for its object a process for the preparatory treatment of skins of fish such as, and in particular, the Plagiostomi which constitute, among the Chondropterygii-Selachii, an order to which the sharks belong the said process presenting numerous advantages, in particular that of considerably reducing the operation of tanning proper which may, if desired, be done away with altogether, considerably reducing the cost price of the leather, a further advantage of the process lying in the fact that it permits of obtaining a leather which is at the same time very supple and very resistant.

The present invention consists of a process in which the skins, after the known treatment with lime, but for a considerably reduced duration are subjected to the action of colloids, of the type of gum tragacanth or colloids which originate from radiate parts of plants (with radiate fibrous structure). Traganth or tragacanth is a kind of gum obtained from various species of Astragalus, Fœnum Græcum is the elongated legume of Siligna dulcis, the alga is itself a fiber.

As a result of the preparatory treatment, the operation of tanning proper can be considerably reduced; for instance, a tanning by the chrome process of from 4 to 5 hours will be sufficient to obtain a leather of excellent quality. This result may be explained by the fact that by this treatment the fibres of the skin appear to surround themselves with an insulating envelope of the colloidal substance, in such way that a sort of tanning action is obtained, the different fibres being so insulated from one another that the fibrous conglomerate then presents a cellular structure. This treatment with colloids may be simply followed by a mechanical treatment consisting in subjecting the skins to alternate tension and expansion by which the fibres so insulated will be disposed parallel to one another, and the leather obtained will present an extraordinary suppleness and also very great resistance.

This preparatory treatment with colloids may, moreover, be combined with the treatment for bating the skins by enzymes, to which the treatment with colloids will be consecutive, after which the skins will be tanned or simply subjected to a mechanical treatment.

By way of an example of carrying the process into effect, the operation may be as follows: Gum tragacanth or water of algæ or of fenugreek are diluted in such way as to form a viscous liquid of about 5% concentration in which the limed skins are treated for approximately 6 hours at a temperature of about 30° C., in a pit where they are stirred or in a fulling mill. After a five-minute rinsing, the skins are dried and treated mechanically as explained above or, again, subjected to a tanning by a vegetable or mineral process, for instance, to a tanning by chrome.

The skins of Plagiostomi prepared in accordance with the process with colloids, may, moreover, be employed to advantage for the production of waterproof leathers, and for this purpose the skins so treated are dried and impregnated with a waterproofing solution such as, for preference, a solution of rubber in benzols or a solution of stearate of lime in benzols; after drying, the skins are subjected to a currying process.

It is naturally understood that it is possible, without departing from the invention, to make variations and modifications of details in the process which forms the subject thereof.

Having now particularly described and ascertained the nature of my said invention and in what manner the same is to be performed, I declare that what I claim is:—

1. A process for the preparatory treatment of skins of Plagiostomi and the like, including the steps of treating the skins with lime and then for a considerably reduced period subjecting them to the action of colloids of the type of gum tragacanth.

2. A process for the preparatory treatment of skins of fish as claimed in claim 1 including the additional steps of bating the skins with enzymes after liming and before colloidal treatment, the said skins, after a short treatment with lime being subjected to the enzymic action of enzymes prior to the treatment with colloids.

3. A process as claimed in claim 1 wherein the skins are waterproofed by impregnating them after drying with a benzolic solution of waterproofing material.

4. A process for the treatment of skins of sharks and the like, comprising the introduction of said skins after liming and other preparatory treatment into a viscous liquid containing about 5% of gum tragacanth or water extract of algæ or of fenugreek for approximately 6 hours at a temperature of about 30° C., sprinkling said skins, and drying said skins to prepare them for final treatment.

In testimony whereof I affix my signature.
ALFRED EHRENREICH.